INVENTOR.
STEPHEN E. TOWNSEND
BY Anthony D. Cennamo
Joseph F. Rosenthal

INVENTOR.
STEPHEN E. TOWNSEND
BY

Nov. 18, 1969 S. E. TOWNSEND 3,479,453
FACSIMILE RESOLUTION IMPROVEMENT BY UTILIZATION OF
A VARIABLE VELOCITY SWEEP SIGNAL
Filed Jan. 4, 1965 3 Sheets-Sheet 3

INVENTOR.
STEPHEN E. TOWNSEND
BY Anthony D. Cennamo
Joseph J. Rosenthal

United States Patent Office 3,479,453
Patented Nov. 18, 1969

3,479,453

FACSIMILE RESOLUTION IMPROVEMENT BY UTILIZATION OF A VARIABLE VELOCITY SWEEP SIGNAL

Stephen E. Townsend, Rochester, N.Y., assignor to Xerox Corporation, Rochester, N.Y., a corporation of New York Filed Jan. 4, 1965, Ser. No. 423,070
Int. Cl. H04n 5/84
U.S. Cl. 178—6.7 5 Claims

ABSTRACT OF THE DISCLOSURE

A facsimile recorder, wherein the two-level video signal is combined with the linear sweep signal to provide a modified variable velocity sweep signal, the modified sweep signal providing improved resolution by slowing down the sweep when the printing level of the video signal is detected.

Figure 1:
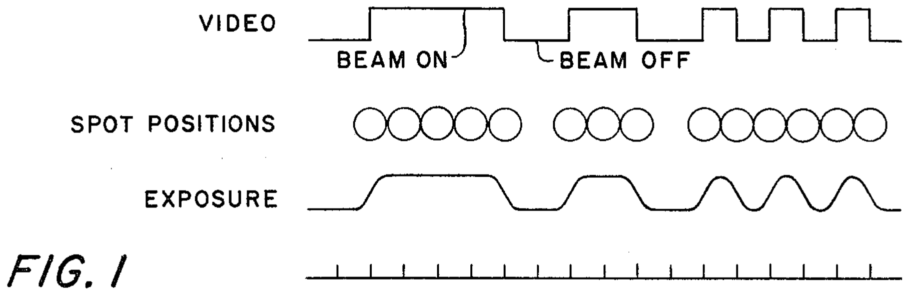

This invention relates to improvements in facsimile and television in which the sweep waveform is modified in accordance with the video signal.

It is conventional in a facsimile system to employ a transmitter which scans an original document in some regular pattern of sequential lines and derives a video signal which is linearly related to the optical density of the elements of the original being scanned. This signal is transmitted to a remote receiver which scans a sheet of paper at constant velocity in synchronism with the transmitter and converts variations in the signal to variations in optical density, thus recreating the original document. This type of facsimile system will transmit any form of document, but is particularly useful for transmitting pictures. The resolution and fidelity of the image produced at the receiver depends on the characteristics of the transmitter and receiver and also on the frequency, phase distortion, and noise characteristics of the telephone line, radio channel or other transmission link used to connect the transmitter and receiver.

The transmission link is often by far the most expensive element in a facsimile system and the one which principally limits the speed and/or quality of transmission. A second type of facsimile system minimizes these limitations by sacrificing the capability of transmitting photographs or other continuous tone originals. In this type of facsimile system, the transmitter produces a signal which is limited to one of two discrete values, representative of black or white areas on the original document. The receiver makes corresponding black marks upon receiving a black signal. With this type of system, it is possible to transmit documents at a greater rate or at higher resolution and with fewer errors than with a system that retains continuous tone capabilities. In such a two-level system, the maximum number of black-white transitions for a given length of scan, or the minimum pulse width, is fixed by the frequency response of the entire system.

Proper recording in the above facsimile system depends upon the characteristics of the receiver. A typical facsimile receiver includes a cathode ray tube in which a beam of eletcrons is linearly swept across a fluorescent screen in synchronism with the transmitter and is turned on and off in accordance with the received signal. The resulting spot of light is imaged on a photosensitive recording medium, which may be assumed to be photographic emulsion, which turns black in exposed areas upon development. The inherent disadvantage in this system lies in the finite spot size produced by the cathode ray tube. Characteristics of the optical system and recording medium may increase the spot size still further. The finite spot size characteristically degrades, the appearance of the reproduced image and reduces the resolution which might otherwise be obtained. An infinitely small spot would maximize resolution but would produce an undesirable pattern of widely separated thin lines. A narrow line would be a desirable spot shape but this, like an infinitely small spot, is not readily attainable.

Other types of recorders are known but exhibit essentially the same characteristics. Thus, a cathode ray tube device may be used with other types of photosensitive materials which may either darken or lighten under the influence of light or may be imaged directly in a human eye, as in television. Electromechanical devices may be used to scan a spot of light and non-optical devices are also known such as electrochemical or thermal stylus recorders. All recorders exhibit a finite spot size which can usually be approximated by a circle or other simple geometrical shape, and generally employ a spot size which is comparable to the line spacing employed and to the maximum electrical resolution capability of the signal source to which they are connected.

Figure 3:
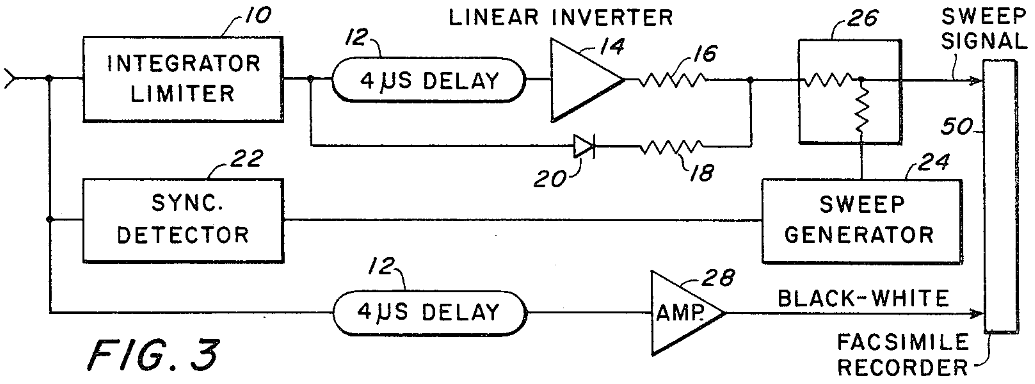
Figure 5:
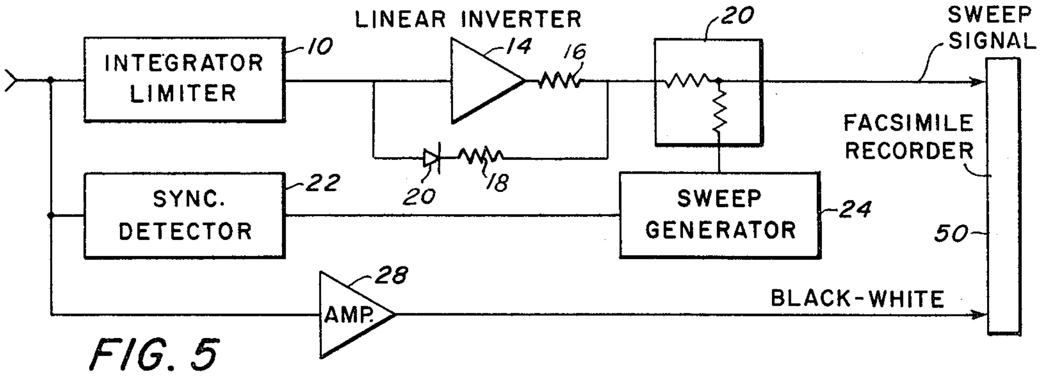
Figure 6:
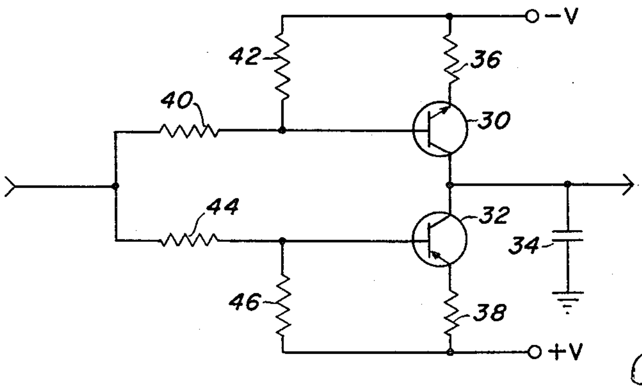
Figure 2:
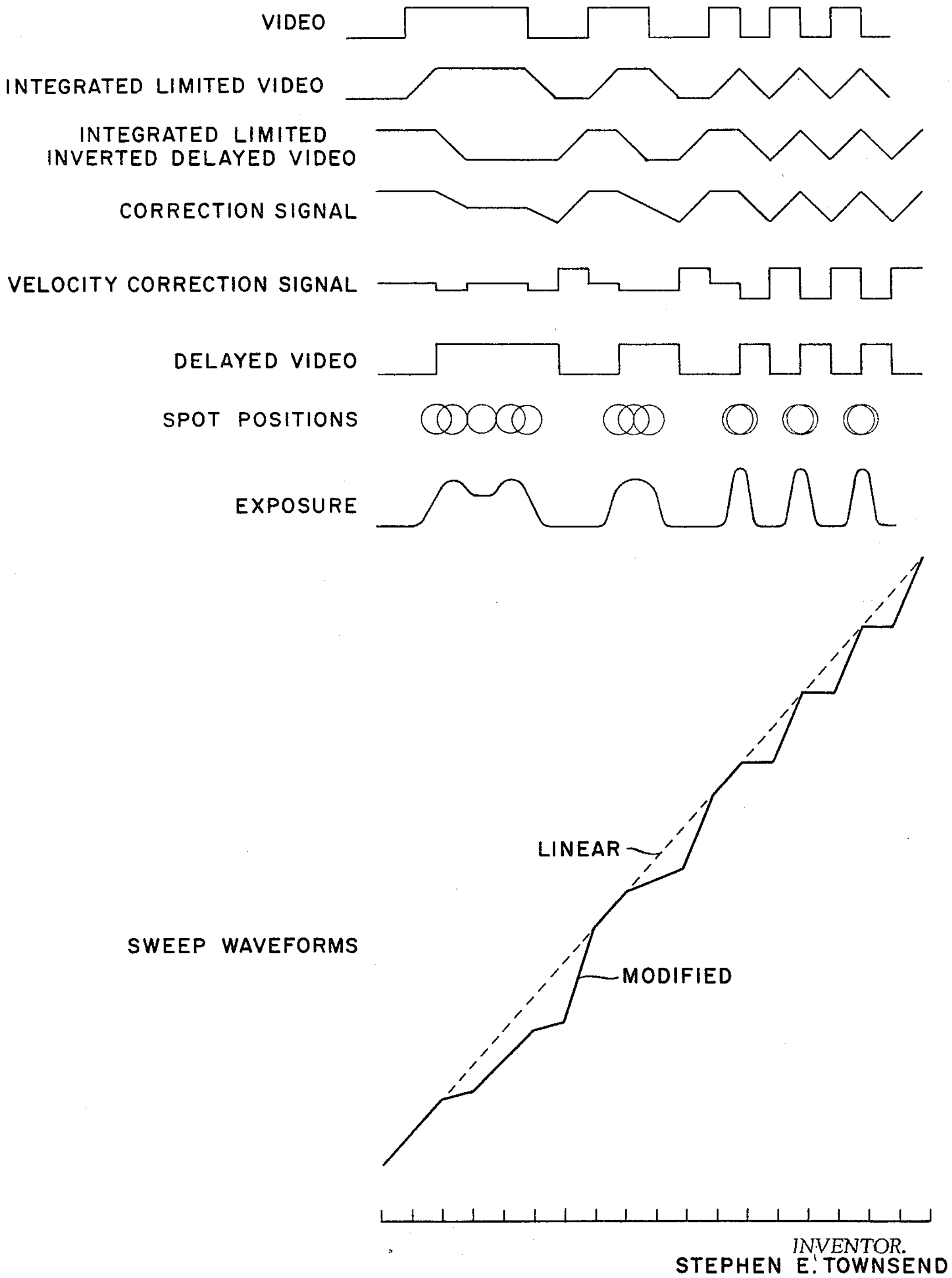
Figure 4:
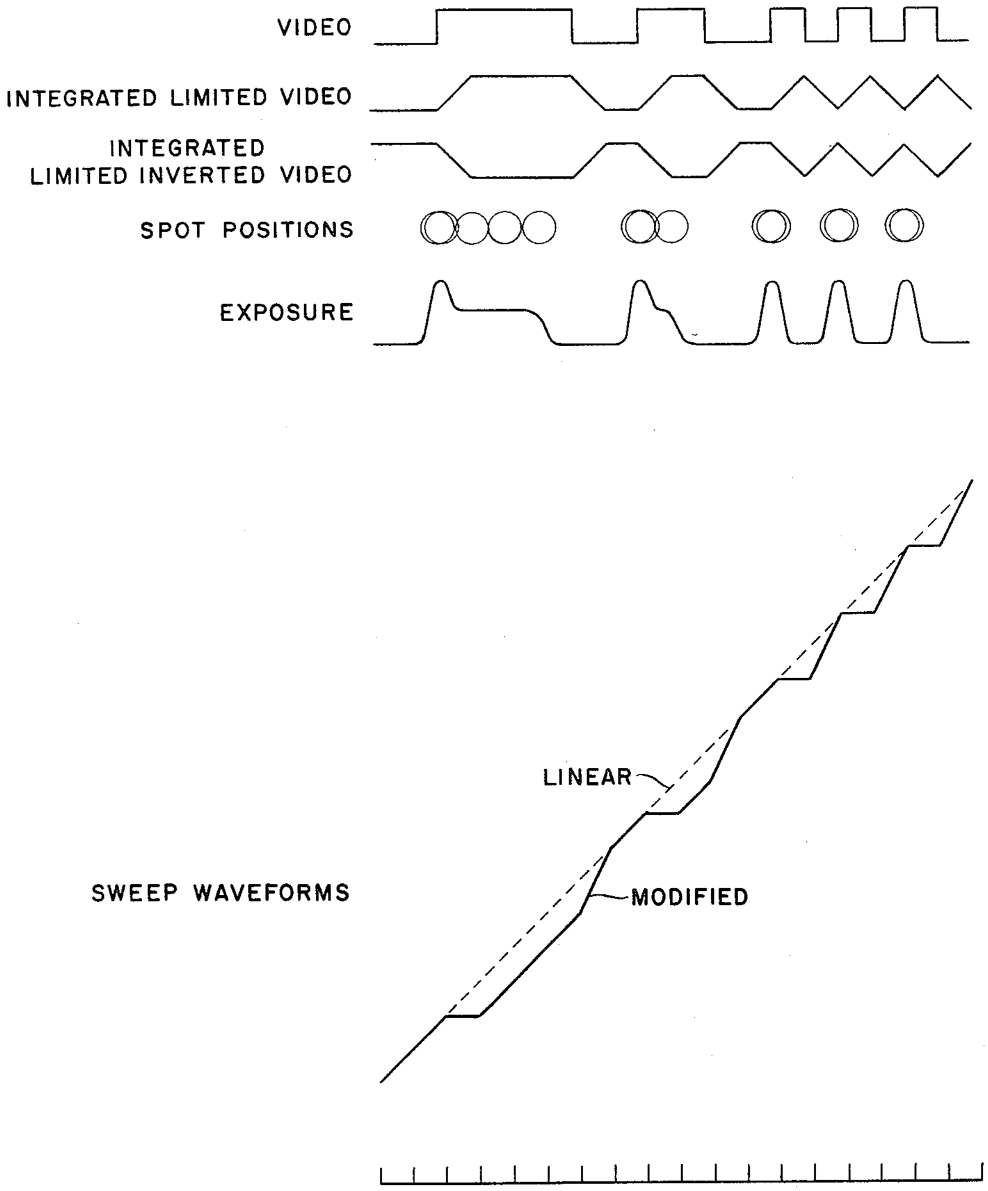

FIG. 1 is a set of waveforms representing normal facsimile or television receiver operation, FIG. 2 is a set of waveforms according to one embodiment of the invention, FIG. 3 is a receiver circuit corresponding to said embodiment, FIG. 4 is a set of waveforms corresponding to a second embodiment in the invention, FIG. 5 is a receiver circuit corresponding to said second embodiment; and, FIG. 6 is a schematic diagram of an integrator for use in the circuits of FIGS. 3 and 5.

FIG. 1 illustrates the operation of a typical two-level facsimile or television system in reproducing areas of medium and high resolution. The horizontal scale is in units of four microseconds, which will be considered throughout this specification as illustratively representing the maximum resolution capability of the video signal itself. This would represent a typical high-speed facsimile system or low-speed television system. The illustrated video signal contains transitions at the maximum rate, shown at the right-hand side of the illustrated waveform, as well as slower transitions corresponding to wider black and white areas. Below the video waveform is shown a series of circles corresponding to recording spot positions at four microsecond intervals, assuming that the upper level of the video waveform represents "beam on." The illustrated spots are drawn to a size corresponding to the spot travel in a four microsecond interval. This approximates a typical condition encountered in facsimile or television. It is apparent that in regions of maximum signal transition rate, the spot positions do not effectively convey the information in the video signal. On the next line of the figure there is plotted a curve representing the exposure produced by the scanning spot as a function of time or distance, these being interchangeable. It can be seen that, due to the finite spot size, transitions in the video signal do not produce sharply defined changes in exposure. This is most clearly apparent at the right-hand side of the curve, corresponding to transitions at the maximum permissible four microsecond rate, where the image of the spot is blurred to about twice the length which could be achieved with a stationary spot. It is apparent that even a slight enlargement of the spit size from that illustrated would almost completely eliminate changes in exposure intensity corresponding to video signal transitions at the maximum rate. Such a condition is likely to be encountered.

It is accordingly an object of the invention to improve the performance of facsimile and television receivers.

It is a further object to provide means and methods to improve the resolution and image quality of two-level facsimile and television receivers by retarding the scanning spot in the neighborhood of black-white transitions.

This is accomplished by appropriately re-shaping and processing the video signal and adding it to the scanning sweep signal.

FIG. 2 is a set of waveforms illustrating a preferred embodiment of the invention and should be considered in connnection with the corresponding circuit shown in FIG. 3. The first line of FIG. 2 is the same video waveform as that shown in FIG. 1. The second line shows the video signal after having undergone a process of integration and limiting. It can be seen that four microseconds is required to integrate from one limiting value to the other. The third line shows the integrated waveform after having been further inverted and delayed by four microseconds. As shown in FIG. 3, these operations are performed by passing a video signal successively through an integrator limiter 10, a four microsecond delay circuit 12, and a linear inverter circuit 14. Returning to FIG. 2, the next line shows a correction signal which is jointly derived from the integrated and limited video signal and from the integrated, limited, inverted and delayed video signal. It can be seen that when the delayed video is "above" the integrated video, then the correction signal is identical to the delayed video. When the delayed video is "below" the integrated video, then the correction signal represents the average of the above two signals. The generation of the correction signal can be readily understood from FIG. 3. The integrated, delayed, inverted video from inverter 14 is passed through a resistor 16 and the integrated video from integrator 10 is passed through diode 20 and resistor 18. The correction signal of FIG. 2 appears at the junction of resistors 16 and 18, which preferably have the same value. When the signal from inverter 14 is more positive than that from integrator 10, then diode 20 is back biased and the signal at the junction of resistors 16 and 18 is equal to the output of inverter 14. When the output of integrator 10 is more positive than the output of inverter 14, then diode 20 is forward biased and the voltage at the junction of resistors 16 and 18 is the average of the outputs of integrator 10 and inverter 14. Thus, the signal at the junction of resistors 16 and 18 is the position correction signal shown in FIG. 2. The video signal normally also contains periodic synchronizing signals which are detected in a sync detector 22 which is used to control a linear sweep generator 24. The sweep signal from generator 24 is combined with the correction signal in an adder circuit 26 and applied to the deflection circuits of the facsimile recorder 50.

The resulting sweep waveforms are shown on FIG. 2. The straight dashed diagonal line represents the sweep position as a function of time in the absence of a correction signal. The solid irregular line represents the sweep as modified by the correction signal. The modified sweep accelerates, speeds up, and slows down with respect to the original linear sweep, and even stops at times. The modified sweep is used in connection with the original video signal which is delayed four microseconds by delay circuit 26 and amplified by amplifier 28 to provide a black-white signal for application to the facsimile recorder 50. The delayed video is shown in FIG. 2. Spot positions at four microsecond intervals are illustrated below the delayed video signal and it will be understood that these are plotted in their appropriate locations relative to the delayed video signal, rather than on the linear time scale used for other curves illustrated in FIG. 2. A corresponding exposure curve is plotted below the spot positions. It can be seen that the operation of the circuit of FIG. 3 results in a slight compression of the recorded black areas, which is not undesirable. Exposure intensity is enhanced at the edges of long black areas due to a slowing down of the spot travel and this serves to enhance the apparent sharpness of such areas. The most notable effect of the circuit, however, is seen in the maximum resolution areas where the recording spot is essentially held stationary for the four microseconds during which it is turned on. This results in a greatly enhanced exposure level and a much more clearly defined separation of these narrow black areas. Normally, the amplitude of the correction signal will be adjusted so as to stop the scan or sweep while recording marks of minimum length.

In some types of recorders, such as those employing electrostatically deflected cathode ray tubes, the sweep signal will directly determine spot position, and the previously described correction signal is appropriate. In other types of recorders, such as those employing magnetically deflected cathode ray tubes, the sweep signal may control sweep velocity. In such cases, the described correction may be differentiated in a conventional differentiater circuit to yield the illustrated velocity correction signal, which is then added to the appropriate sweep waveform.

FIG. 4 represents a set of waveforms appropriate to a simpler embodiment of the invention illustrated in the circuit of FIG. 5. The video signal, illustratively the same as that of FIGS. 1 and 2, is integrated and limited as before and inverted without any delay. This signal is itself used as the correction signal. As can be seen from an inspection of the illustrated sweep waveform, spot positions and exposure distribution, this circuit is also capable of stopping the spot while recording signals of minimum length. However, in printing longer signals, the spot is retarded at only one end of the printed area. This form of asymmetry is not serious in practice and accordingly, the simplified system represented by FIGS. 4 and 5 retains the principal advantages of the invention.

FIG. 6 illustrates one type of integrator limiter which can be used as the circuit element 10 of FIG. 3 or 5. The collectors of an NPN transistor 30 and a PNP transistor 32 are connected together to a capacitor 34, the other terminal of which is connected to ground or to some other fixed potential. The emitter of transistor 30 is connected to a negative supply voltage through resistor 36 and the emitter of transistor 32 is connected to a positive supply voltage through resistor 38. Resistors 36 and 38 will ordinarily be equal to each other. The base of transistor 30 is connected to the tap of a voltage divider consisting of resistors 40 and 42 which is connected between the input terminal and the negative voltage supply. Similarly, the base of transistor 32 is connected to the junction of resistors 44 and 46 which are connected between the input and the positive supply voltage. Normally, one transistor will be turned on and the other turned off, depending upon the input voltage. Since the base-emitter voltage drop of the on transistor is very small, the current through the emitter resistor will essentially be the ratio of the base voltage, which is essentially constant between input transitions, and the emitter resistor which is likewise constant. Since the emitter and collector currents in a transistor are substantially equal to each other, constant current will be supplied to the capacitor 34 until it has charged up to the emitter voltage of the active transistor, at which point the current will cease. Thus, the voltage on capacitor 34 is an integrated and limited version of the input voltage, as is required in the invention. Obviously, other forms of electronic circuitry can be used as well.

Although the invention has been described in terms of specific examples and values, these illustrate the desirable relations which should exist regardless of the speed of the facsimile or television signals and the particular circuit configurations which may be adopted. Thus, the integrator limiter or its functional equivalent should integrate from one limiting value to another in a time on the order of the minimum transition period which will be encountered with the particular source of signals being used. Delay circuit 12, if employed, should delay by about this same period as should also delay circuit 26. The magnitude of the correction signal should be adjusted so that the sweep is slowed down near transitions and may be adjusted so that the sweep is just slowed to a halt when recording elements of minimum length.

Signal polarities should be controlled so that the sweep is slowed down rather than speeded up during marking or printing intervals. In the described embodiments, the printing operation consisted of turning on a cathode ray beam to form black marks on a photographic emulsion. In other circumstances, as in recording on a xerographic drum, the printing operation may produce white rather than black marks. In these situations, it is necessary to perform an additional inversion on the video signal, or else to eliminate an inversion in order that the sweep delay corresponds to the signal level or polarity which is used to effectuate the marking, recording, printing, or display operation.

Other variations in the invention will occur to those skilled in the art and are intended to be encompassed by the following claims, in which the term display device is intended to cover both television and facsimile receivers and similar devices.

What is claimed is:

1. A two-level video display device, one level of a video signal being a printing level and the other level being a non-printing level, comprising
means to derive a sweep signal,
means to delay said video signal,
means to derive a sweep correction signal from said video signal, said means including
means to indicate transitions in said video signal between said printing and non-printing levels, and
means to delay said correction signal substantially the same amount as said video signal,
means to combine said sweep signal and said sweep correction signal, and
means to display a visible image, said image controlled in position by said combined sweep and sweep correction signal and controlled in brightness by said delayed video signal.

2. A two-level video signal display device comprising
means to integrate and limit a video signal,
means to invert said integrated and limited video signal,
means to generate a sweep signal,
means to combine said sweep signal and said inverted, integrated and limited video signal to provide a modified sweep signal, and
means to display a visible image, said image control in position by said modified sweep signal and controlled in brightness by said video signal.

3. A two-level video signal receiver comprising,
means to integrate and limit a video signal,
means to generate a sweep signal,
first delay means to delay said integrated and limited signal,
means to invert said integrated, limited and delayed signal,
means responsive to one polarity of difference between said integrated signal and said integrated limited delayed-inverted signal to derive a correction signal proportional to said integrated limited delayed-inverted signal and responsive to the other polarity of said difference to derive a correction signal proportional to the average of said integrated and said integrated limited delayed-inverted signal,
means to add said correction signal to said sweep signal to form a corrected sweep signal, and
second delay means to delay said video signal.

4. The receiver of claim 3 further including means responsive to said corrected sweep signal and said delayed video signal to display said two-level video signal.

5. The receiver of claim 4 in which each of the integrating time of said integrator limiter, the delay time of said first delay means and the delay time of said second delay means are substantially equal to each other and substantially equal to the minimum transition time of said two-level video signal.

References Cited

UNITED STATES PATENTS

| | | | |
|---|---|---|---|
| 2,585,002 | 2/1952 | Frum | 315—22 |
| 2,649,555 | 8/1953 | Lockhart | 315—26 |
| 2,752,421 | 6/1956 | Ross | 178—6.8 |
| 3,215,773 | 11/1965 | Chatten | 178—6.8 |
| 3,229,033 | 1/1966 | Artzt | 178—6.8 |

FOREIGN PATENTS

| | | |
|---|---|---|
| 16,050 | 1/1934 | Australia. |

ROBERT L. GRIFFIN, Primary Examiner
JOSEPH A. ORSINO, Jr., Assistant Examiner

U.S. Cl. X.R.

178—6.8, 7.5; 315—18, 27; 346—110